United States Patent
Huang et al.

(10) Patent No.: US 11,869,224 B2
(45) Date of Patent: *Jan. 9, 2024

(54) METHOD AND SYSTEM FOR ESTABLISHING LIGHT SOURCE INFORMATION PREDICTION MODEL

(71) Applicant: Acer Incorporated, New Taipei (TW)

(72) Inventors: Yi-Jin Huang, New Taipei (TW); Chien-Hung Li, New Taipei (TW); Yin-Hsong Hsu, New Taipei (TW)

(73) Assignee: Acer Incorporated, New Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/960,108

(22) Filed: Oct. 4, 2022

(65) Prior Publication Data

US 2023/0045128 A1  Feb. 9, 2023

Related U.S. Application Data

(63) Continuation of application No. 16/813,741, filed on Mar. 10, 2020, now Pat. No. 11,494,585.

(30) Foreign Application Priority Data

Jan. 15, 2020 (TW) .................................. 109101420

(51) Int. Cl.
*G06K 9/62* (2022.01)
*G06V 10/141* (2022.01)
(Continued)

(52) U.S. Cl.
CPC .......... *G06V 10/141* (2022.01); *G06F 18/214* (2023.01); *G06F 18/217* (2023.01);
(Continued)

(58) Field of Classification Search
CPC . G06F 19/321; G06F 16/5866; G06T 7/0085; G06T 7/0083; G06T 7/00;
(Continued)

(56) References Cited

U.S. PATENT DOCUMENTS 5,907,629 A * 5/1999 Funt ..................... G06K 9/4652
382/162
7,180,629 B1 * 2/2007 Nishio ................... H04N 9/735
348/223.1

(Continued)

OTHER PUBLICATIONS

Chen et al. ("Automatic White Balance Based on Estimation of Light Source Using Fuzzy Neural Network", 2009 4th IEEE Conference on Industrial Electronics and Applications, 2009, pp. 1905-1910, doi: 10.1109/ICIEA.2009.5138534) (Year: 2009).*

*Primary Examiner* — Duy M Dang
(74) *Attorney, Agent, or Firm* — JCIPRNET (57) ABSTRACT

A method and a system for establishing a light source information prediction model are provided. A plurality of training images are captured for a target object. A white object is attached on the target object. True light source information of the training images is obtained according to a color of the white object in each of the training images. A neural network model is trained according to the training images and the true light source information, and a plurality of pieces of predicted light source information is generated according to the neural network model during the training. A learning rate for training the neural network model is adaptively adjusted based on the predicted light source information.

9 Claims, 4 Drawing Sheets

(51) Int. Cl.
*G06V 10/56* (2022.01)
*G06F 18/214* (2023.01)
*G06F 18/21* (2023.01)
*G06V 10/764* (2022.01)
*G06V 10/774* (2022.01)
*G06V 10/776* (2022.01)
*G06V 10/82* (2022.01)

(52) U.S. Cl.
CPC .......... *G06V 10/56* (2022.01); *G06V 10/764* (2022.01); *G06V 10/774* (2022.01); *G06V 10/776* (2022.01); *G06V 10/82* (2022.01)

(58) Field of Classification Search
CPC ......... G06T 2207/10116; G06T 7/0012; G06T 2207/30004; G06T 5/40; G06T 2207/30068; G06T 1/00; G06T 7/11; G06T 7/12; G06T 7/13; G06T 7/0016; G06T 7/60; G06T 7/174; G06K 9/4604; G06K 9/52; G06K 9/6267; G06K 9/66; G06K 9/6256; G06K 9/2027; G06K 9/4652; G06K 9/6262; G06K 9/6272; G06K 9/00624; G06K 9/623; G06K 9/6253; G06N 20/00; G01N 33/48; G01N 33/5091; G01N 33/4833; G06Q 30/02; G06Q 30/0269; G06Q 30/0277; A61B 5/02007; A61B 5/7264; A61B 5/742
See application file for complete search history.

(56) References Cited

U.S. PATENT DOCUMENTS 10,951,875 B2 * 3/2021 Wetzstein ............ H04N 13/178
2010/0245594 A1 * 9/2010 Tobie .................. H04N 17/002
348/188

* cited by examiner

METHOD AND SYSTEM FOR ESTABLISHING LIGHT SOURCE INFORMATION PREDICTION MODEL

CROSS-REFERENCE TO RELATED APPLICATION

This application is a continuation application of and claims the priority benefit of a prior application Ser. No. 16/813,741 filed on Mar. 10, 2020, now pending. The prior application Ser. No. 16/813,741 claims the priority benefit of Taiwan application serial no. 109101420, filed on Jan. 15, 2020. The entirety of each of the above-mentioned patent applications is hereby incorporated by reference herein and made a part of this specification.

BACKGROUND

Technical Field

The disclosure relates to a white balance processing technology, and in particular, to a method and a system for establishing a light source information prediction model.

Description of Related Art

With the development of science and technologies, various smart image capture devices, such as a tablet computer, a personal digital assistant, and a smart phone, etc., have become indispensable tools for modern people. The camera lenses carried in high-end smart image capture devices are even comparable to or capable of replacing traditional consumer cameras. Some high-end models even live up to the standard of digital single lens cameras in terms of pixels and image quality or offer some advanced functions or effects.

A photographer may use an image capture device for photographing at different locations or times, and therefore the image capture device is used to capture images under different light source environments. The light source in the photographing environment directly affects the color of a photographed target rendered in the captured image. In a scenario, the wounded may capture an image of the wound or affected region and provide the captured image to a medical unit for diagnosis. If, responding to the light source of the photographing environment, the color information in the image is distorted, a correct diagnosis cannot be made based on the captured image. The basic steps of white balance processing is to firstly estimate the light source information, and then correct the image by using the estimated light source information to render the image as if it were illuminated by a standard light source. Therefore, how to accurately estimate the light source information is now an issue for those of ordinary skill in the art to work on.

SUMMARY

In view of this, the disclosure proposes a method and a system for establishing a light source information prediction model, which can efficiently establish an accurate light source information prediction model, thereby effectively performing image white balance adjustment based on the light source information prediction model.

An embodiment of the disclosure provides a method for establishing a light source information prediction model. The method includes the following steps: capturing a plurality of training images for a target object, where a white object is attached on the target object; obtaining true light source information of the training images according to a color of the white object in each of the training images; and training a neural network model according to the training images and the true light source information, and generating a plurality of pieces of predicted light source information according to the neural network model during the training, where a learning rate for training the neural network model is adaptively adjusted based on the predicted light source information.

An embodiment of the disclosure provides a system for establishing a light source information prediction model, including an image sensor, a storage device, and a processor. The storage device stores a plurality of modules. The image sensor captures a plurality of training images for a target object, where a white object is attached on the target object. The processor is coupled to the storage device and the image sensor, configured to execute the modules to perform the following steps: obtaining true light source information of the training images according to a color of the white object in each of the training images; and training a neural network model according to the training images and the true light source information, and generating a plurality of pieces of predicted light source information according to the neural network model during the training, where a learning rate for training the neural network model is adaptively adjusted based on the predicted light source information.

Based on the above, in the embodiments of the disclosure, by attaching the white object to the target object, the true light source information may be directly obtained according to the color of the white object in the training image to facilitate the training of the neural network model. In addition, in the embodiments of the disclosure, during the training of the neural network model, the learning rate for training the neural network model is adaptively adjusted based on the predicted light source information to facilitate the training efficiency and the accuracy of predicting ambient light sources by the neural network model.

To make the features and advantages of the disclosure clear and easy to understand, the following gives a detailed description of embodiments with reference to accompanying drawings.

DESCRIPTION OF THE EMBODIMENTS

Some embodiments of the disclosure will be described in detail below with reference to the accompanying drawings. For reference symbols used in the following descriptions, same reference symbols in different drawings represent same or similar components. These embodiments are merely a part of the disclosure, and do not disclose all possible implementations of the disclosure. More specifically, these embodiments are merely examples of a method, an apparatus, and a system in the claims of the disclosure.

Figure 1:
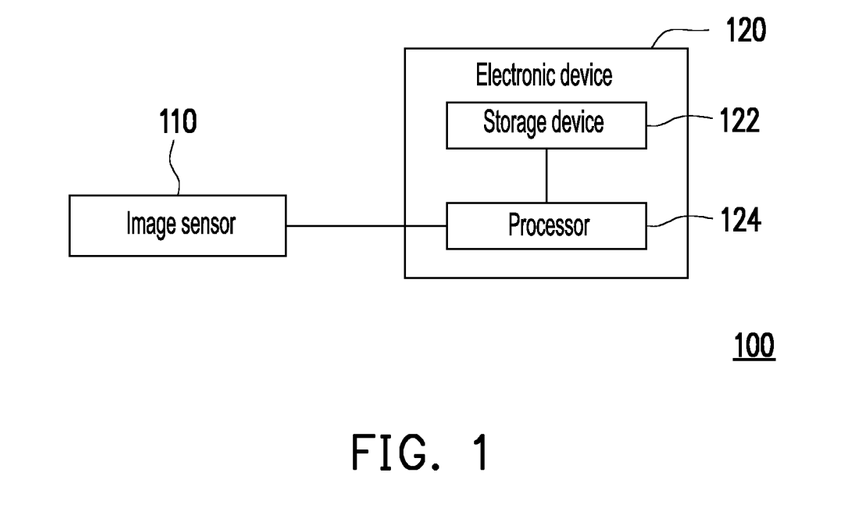
FIG. 1 is a block diagram of a system for establishing a light source information prediction model according to an embodiment of the disclosure.

FIG. 1 is a block diagram of a system for establishing a light source information prediction model according to an embodiment of the disclosure, but only for convenience of description and is not used to limit the disclosure. First, FIG. 1 first introduces all components and configuration relationships of the system for establishing the light source information prediction model. Detailed functions will be disclosed together with FIG. 2.

Referring to FIG. 1, a system 100 for establishing a light source information prediction model includes an image sensor 110 and an electronic device 120, where the electronic device 120 includes a storage device 122 and a processor 124. In the present embodiment, the electronic device 120 may be an electronic device such as a personal computer, a notebook computer, and a tablet computer that has a computing function, and receives an image captured by the image sensor 110 in a wired or wireless manner through a communication interface (not shown).

The image sensor 110 may be disposed in a digital camera, a monocular camera, a digital video camera, a smart phone, a tablet computer, and the like. In the present embodiment, the image sensor 110 is a camera lens including a lens and a photosensitive device. The photosensitive device is configured to sense intensity of light entering the lens to generate an image. The photosensitive device may be, for example, a charge coupled device (CCD), a complementary metal-oxide semiconductor (CMOS) device, or other devices. The image captured by the lens is imaged on a sensing device and converted into a digital signal to be output to the processor 124.

The storage device 122 is configured to store data such as an image and a program code, which may be, for example, any type of fixed or removable random access memory (RAM), a read-only memory (ROM), a flash memory, a hard disk or other similar devices, an integrated circuit, and a combination thereof.

The processor 124 is configured to control actions between components of an image processing system 100, which may be, for example, a central processing unit (CPU), a graphic processing unit (GPU), or other programmable general-purpose or special-purpose microprocessors, a digital signal processor (DSP), an image signal processor (ISP), a programmable controller, an application specific integrated circuit (ASIC), a programmable logic device (PLD), or other similar devices, or a combination of these devices.

Figure 2:
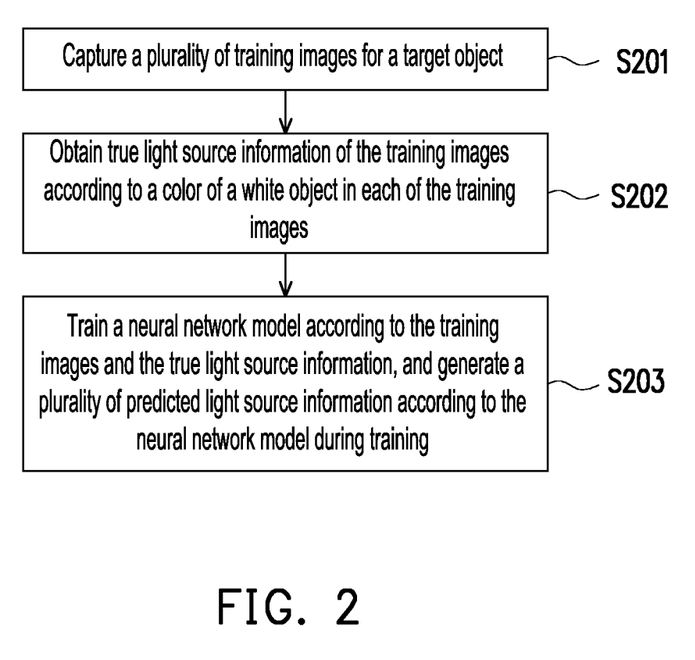
FIG. 2 is a flowchart of a method for establishing a light source information prediction model according to an embodiment of the disclosure.

The following are examples of detailed steps of the method for adjusting white balance for the system 100 for establishing the light source information prediction model. FIG. 2 is a flowchart of a method for establishing a light source information prediction model according to an embodiment of the disclosure. The method of the present embodiment is applicable to the system 100 for establishing the light source information prediction model in FIG. 1. The following describes the detailed process of the method in the present embodiment with various devices in the system 100 for establishing the light source information prediction model.

Figure 3:
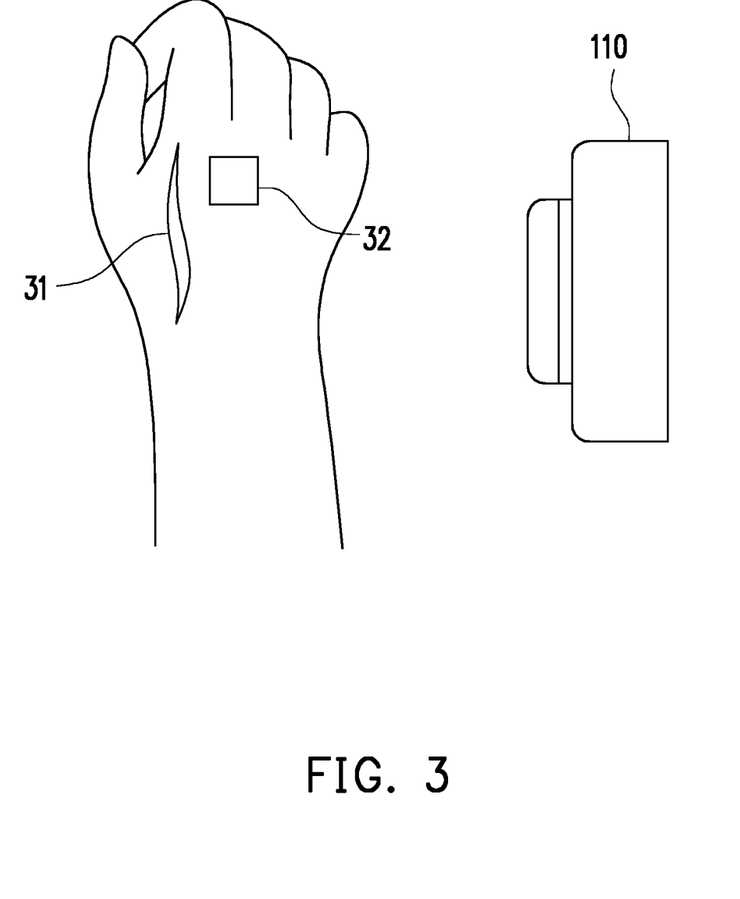
FIG. 3 is a schematic diagram of capturing a training image according to an embodiment of the disclosure.

Referring to FIG. 1 and FIG. 2 together, first, in step S201, the image sensor 110 captures a plurality of training images for a target object. It should be noted that a white object is attached on the target object, and the white object is, for example, a white sticker or other types of objects, which is not limited in the disclosure. The target object is, for example, a wound or other objects. For example, FIG. 3 is a schematic diagram of capturing a training image according to an embodiment of the disclosure. Referring to FIG. 3, assuming that a target object to be photographed is a wound 31, an operator may stick a white sticker 32 near the wound 31. Then, the image sensor 110 may capture a plurality of training images for the wound 31 and the white sticker 32. In an embodiment, these training images may be continuous photographed images corresponding to different photographing time points in a same photographing scene. When the operator needs to press a shutter several times to photograph these training images, the white sticker may further be used as a positioning point, so that the operator may roughly fix the photographing position each time.

In step S202, a processor 124 obtains true light source information of the training images according to a color of the white object in each of the training images. Specifically, in an embodiment, the processor 124 may identify a white object from the training images according to various image object detection technologies, and photograph current true light source information according to the color of the white object presented in the training image. In detail, the color of the white object presented in the training image depends on a non-white color presented by the current photographed true light source information. However, the non-white color may be used to estimate the current photographed true light source information. In an embodiment, the true light source information may include an RGB composition ratio corresponding to an RGB channel (for example, a ratio of light intensity of RGB three-color light). Table 1 is an example of obtaining three sets of true light source information based on three training images, but the disclosure does not limit the quantity of training images. The true light source information of the first training image may be R1', G1', B1' corresponding to the RGB channels, and so on.

TABLE 1

| Photographing time | Training image | True light source information |
|---|---|---|
| T1 | First training image | (R1', G1', B1') |
| T2 | Second training image | (R2', G2', B2') |
| T3 | Third training image | (R3', G3', B3') |

In step S203, the processor 124 may train a neural network model according to the training images and the true light source information, and generate a plurality of pieces of predicted light source information according to the neural network model during the training. The neural network model is, for example, a recurrent neural network (RNN) model. In detail, the processor 124 performs machine learning based on the training images as a training data set and the corresponding true light source information and constructs a neural network model. During the training of the neural network model, the processor 124 may train weight information of each neural network layer in the neural network model according to each prediction result (that is, predicted light source information) and a true result (that is, true light source information).

It should be noted that a learning rate for training the neural network model will be adaptively adjusted based on predicted light source information. During the training, the processor 124 may generate corresponding predicted light source information according to the training image and the neural network model during training, and learn based on the predicted light source information and the true light source information to determine how to adjust the weight information of each neural network layer. Accordingly, the learning rate for training the neural network model is an adjustment amplitude of adjusting the weight information each time. The learning rate masters the learning progress of the neural network model, and how to adjust the learning rate is a key factor in training a good model. In the embodiment of the disclosure, the learning rate will be adaptively adjusted based on the predicted light source information. In other words, during the training of the neural network model, the learning rate is dynamically changed and is not a fixed value. Therefore, in the embodiment of the disclosure, a neural network model configured to predict light source information according to an image may be more efficiently trained.

In an embodiment, after the neural network model is trained, model parameters (such as the quantity of neural network layers, weight of each neural network layer, and the like) of the neural network model may be stored in the storage device 122 for actual prediction of the light source information. Based on this, the processor 124 may perform image white balance correction based on the light source information predicted by the neural network model, for example, looks up a table based on the light source information predicted by the neural network model to obtain a white balance gain parameter, etc. Therefore, in the present embodiment, since the light source information may be accurately estimated, a white balance image generated and output by the processor 124 may achieve more accurate white balance performance.

Figure 4:
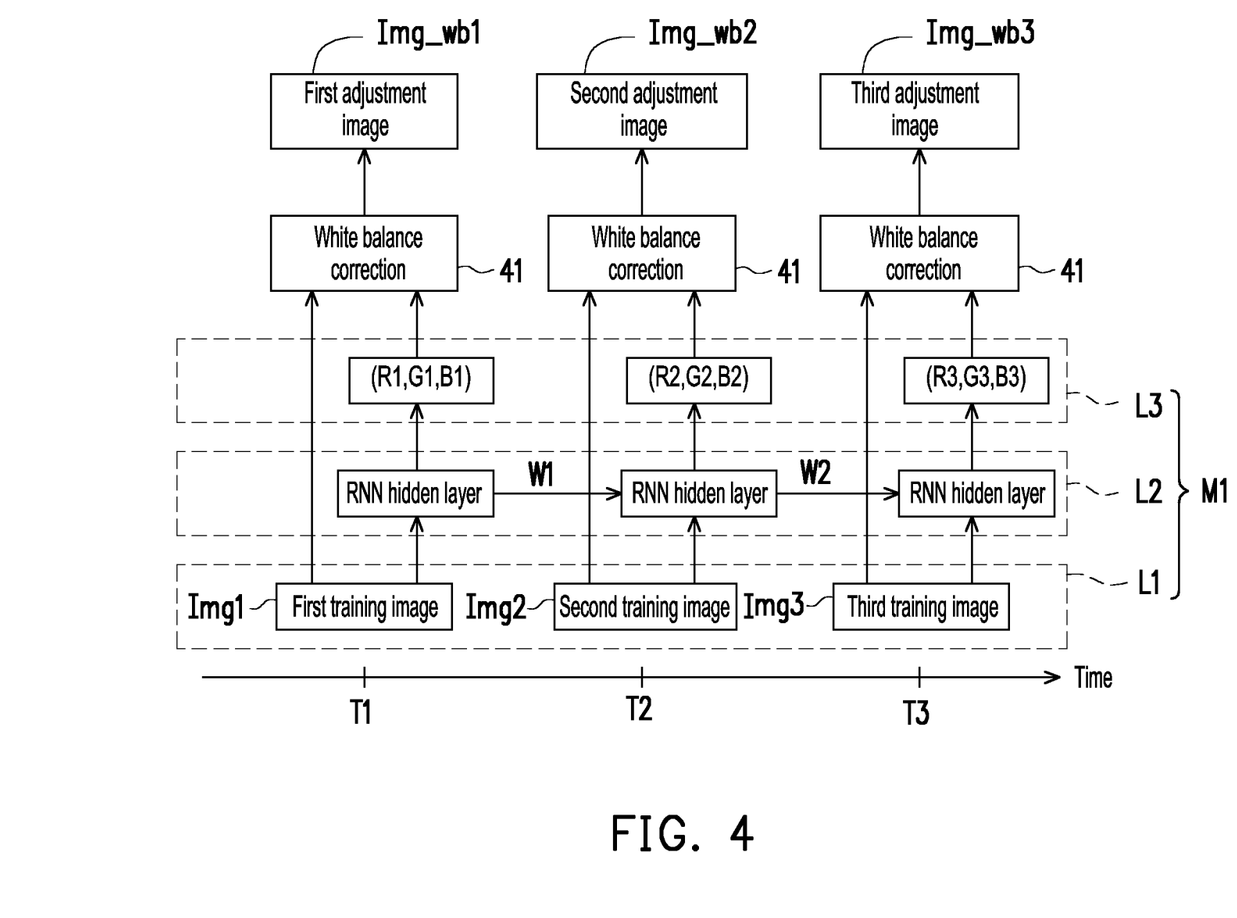
FIG. 4 is a schematic diagram of a method for establishing a light source information prediction model according to an embodiment of the disclosure.

To describe the disclosure more clearly, an example in which the neural network model is a recurrent neural network (RNN) model is described in the following. In an embodiment, the recurrent neural network model is, for example, a long short term memory (LSTM) model. FIG. 4 is a schematic diagram of a method for establishing a light source information prediction model according to an embodiment of the disclosure. Referring to FIG. 4, an image sensor 110 may capture a plurality of training images on a time sequence, which are a first training image Img1 captured at a time T1, a second training image Img2 captured at a time T2, and a third training image Img3 captured at a time T3.

To this end, a neural network model M1 includes an input layer L1, a hidden layer L2, and an output layer L3. Corresponding to the time T1 in the time sequence, the input layer L1 is configured to receive the first training image Img1. The hidden layer L2 generates first predicted light source information (R1, G1, B1) in the output layer L3 according to weight information W1 of the first training image Img1 and the time T1. Corresponding to the time T2 in the time sequence, the input layer L1 is configured to receive the second training image Img2. The hidden layer L2 generates second predicted light source information (R2, G2, B2) in the output layer L3 according to the second training image Img2, the weight information W1 of the time T1, and weight information W2 of the time T2. Corresponding to the time T3 in the time sequence, the input layer L1 is configured to receive the third training image Img3. The hidden layer L2 generates third predicted light source information (R3, G3, B3) in the output layer L3 according to the third training image Img3, the weight information W2 of the time T2, and the weight information W3 of the time T3. In other words, the hidden layer L2 of the neural network model M1 sequentially generates a plurality of pieces of predicted light source information based on a plurality of training images on the time sequence.

In an embodiment, the processor 124 may input at least one piece of the predicted light source information and the true light source information into a loss function to generate a loss value. For example, the processor 124 may calculate the loss value based on a loss function according to the first predicted light source information (R1, G1, B1), the second predicted light source information (R2, G2, B2), the third predicted light source information (R3, G3, B3), and the corresponding three sets of true light source information. The loss function is, for example, a squared difference, Softmax, or the like. The processor 124 may then adjust the weight information in the neural network model M1 from back to front in a reverse transmission manner according to the loss value.

In addition, in an embodiment, the processor 124 may perform white balance processing on the training images according to the predicted light source information to obtain a plurality of adjustment images. Referring to FIG. 4, according to a white balance correction program 41, the processor 124 may perform white balance processing on the first training image Img1 according to the first predicted light source information (R1, G1, B1) to obtain a first adjustment image Img_wb1. By analogy, the processor 124 may perform white balance processing on the second training image Img2 according to the second predicted light source information (R2, G2, B2) to obtain a second adjustment image Img_wb2. The processor 124 may perform white balance processing on the third training image Img3 according to the third predicted light source information (R3, G3, B3) to obtain a third adjustment image Img_wb3. In an embodiment, the white balance correction program 41 is, for example, a conversion layer, that is, the processor 124 may input the training image to the conversion layer to perform white balance processing.

In an embodiment, the processor 124 may determine the learning rate for training the neural network model according to the adjustment images. Referring to FIG. 4, the processor 124 may determine, by comparing pixel values of these adjustment images, whether the model prediction result during training is increasingly more accurate, to adaptively adjust the learning rate for training the neural network model M1.

Figure 5:
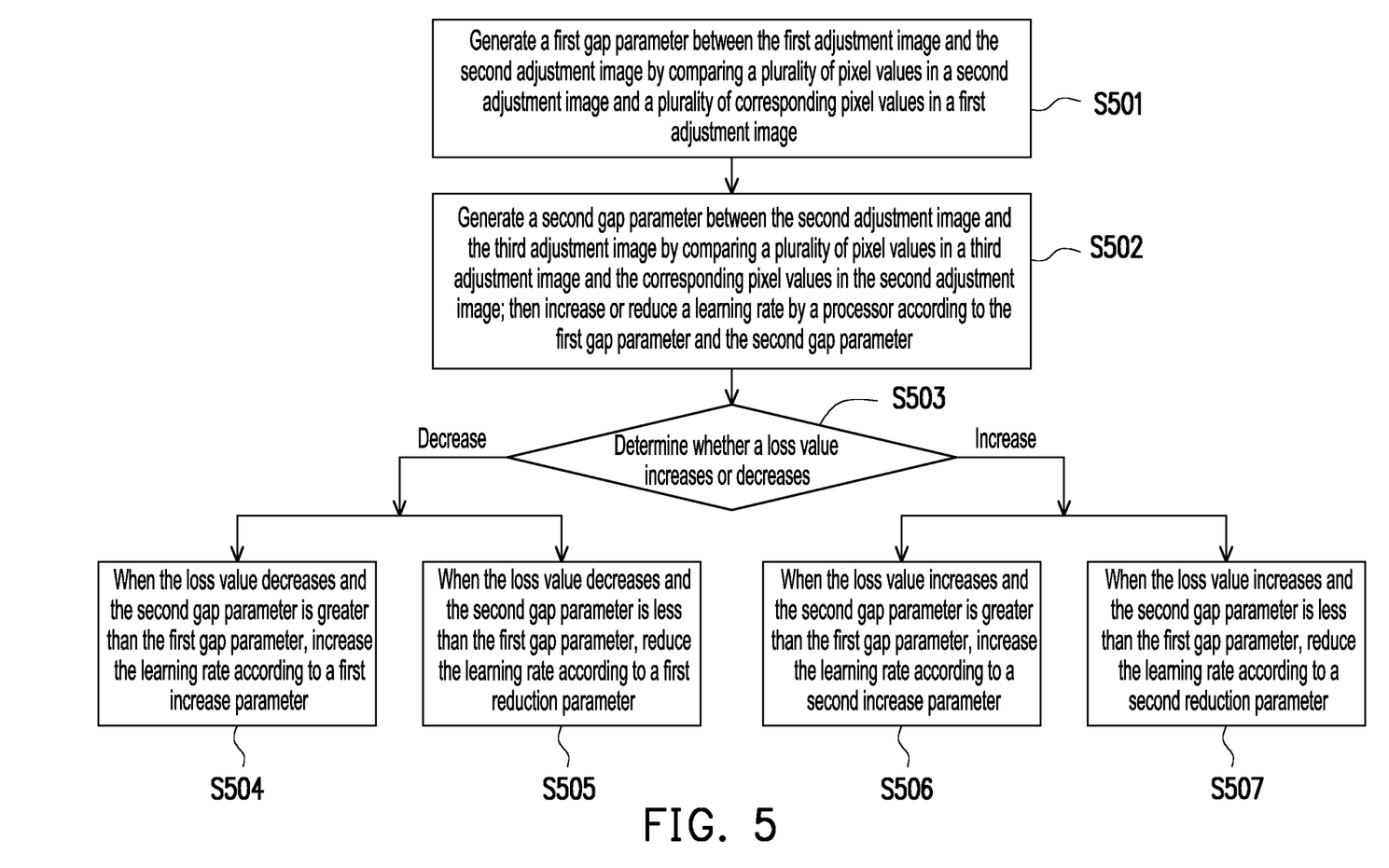
FIG. 5 is a flowchart of adjusting a learning rate according to an embodiment of the disclosure.

FIG. 5 is a flowchart of adjusting a learning rate according to an embodiment of the disclosure. An implementation detail of the foregoing process will be described below with reference to FIG. 5. A detailed process of the method of the present embodiment will be described with reference to the method of the present embodiment and the embodiment of FIG. 4. That is, after the first adjustment image Img_wb1, the second adjustment image Img_wb2, and the first adjustment image Img_wb3 are generated, by comparing the first adjustment image Img_wb1, the second adjustment image Img_wb2, and the first adjustment image Img_wb3, the processor 124 may determine an increase or a decrease in the learning rate for updating weight information.

In step S501, the processor 124 generates a first gap parameter $\Delta d1$ between the first adjustment image Img_wb1 and the second adjustment image Img_wb2 by comparing a plurality of pixel values in the second adjustment image Img_wb2 and a plurality of corresponding pixel values in the first adjustment image Img_wb1. In detail, in an embodiment, the processor 124 correspondingly subtracts a pixel value (that is, an RGB channel pixel value) of a corresponding pixel in the first adjustment image Img_wb1 from the pixel value (that is, an RGB channel pixel value) of each pixel in the second adjustment image Img_wb2, to obtain a pixel difference (that is, an R channel pixel difference, a G channel pixel difference, a B channel pixel difference) corresponding to each pixel position. Then, after an absolute value of these pixel differences is taken, the processor 124 first averages the absolute difference values of the pixels corresponding to the RGB channels at each pixel position to obtain statistical values of the pixel differences corresponding to each pixel position. Finally, the processor 124 may obtain a first gap parameter Δd1 between the first adjustment image Img_wb1 and the second adjustment image Img_wb2 by averaging statistical values of the pixel differences of each pixel position.

Based on a calculation manner similar to step S501, in step S502, the processor 124 generates a second gap parameter Δd2 between the second adjustment image Img_wb2 and the third adjustment image Img_wb3 by comparing a plurality of pixel values in the third adjustment image Img_wb3 and a plurality of corresponding pixel values in the second adjustment image Img_wb2. Next, the processor 124 increases or reduces the learning rate according to the first gap parameter Δd1 and the second gap parameter Δd2. In the present embodiment, the processor 124 increases or reduces the learning rate according to the loss value by comparing the first gap parameter Δd1 and the second gap parameter Δd2.

Then, in step S503, the processor 124 determines whether the loss value increases or decreases. In detail, the processor 124 may obtain a corresponding current loss value when performing model training using the first training image Img1, the second training image Img2, and the third training image Img3, and the processor 124 compares the current loss value with the previous loss values generated by training on the according to other three training images previously to learn that the loss value increases or decreases. It may be learned that, in addition to the loss value between the true light source information and the predicted light source information, in the embodiment of the disclosure, the learning rate is further adjusted for training the neural network model based on the difference between the adjustment images after the white balance correction. Specifically, when the second gap parameter Δd2 is greater than the first gap parameter Δd1, it indicates that the predicted light source information is not accurate, and therefore may be used as a reference factor for adjusting the learning rate.

In step S504, when the loss value decreases and the second gap parameter Δd2 is greater than the first gap parameter Δd1, the processor 124 increases the learning rate according to a first increase parameter. In an embodiment, the processor 124 may increase the learning rate according to a first multiple. For example, assuming the first multiple is 2, the processor 124 may increase, to 0.01, the learning rate from 0.005 multiplied by 2. In an embodiment, the processor 124 may increase the learning rate according to a first ascending number. For example, assuming that the first ascending number is 0.003, the processor 124 may increase the learning rate from 0.005 plus 0.003 to 0.008. In step S505, when the loss value decreases and the second gap parameter Δd2 is less than the first gap parameter Δd1, the processor 124 reduces the learning rate according to a first reduction parameter. In an embodiment, the processor 124 may reduce the learning rate according to a first divisor. For example, assuming the first divisor is 2, the processor 124 may reduce the learning rate from 0.005 divided by 2 to 0.0025. In an embodiment, the processor 124 may increase the learning rate according to a first descending number. For example, assuming that the first descending number is 0.003, the processor 124 may increase the learning rate from 0.005 subtracting 0.003 to 0.002.

In step S506, when the loss value increases and the second gap parameter Δd2 is greater than the first gap parameter Δd1, the processor 124 increases the learning rate according to a second increase parameter. In step S507, when the loss value increases and the second gap parameter Δd2 is less than the first gap parameter Δd1, the processor 124 reduces the learning rate according to a second reduction parameter. The processor 124 uses a same algorithm to increase the learning rate according to the first increase parameter and the second increase parameter, but the first increase parameter is different from the second increase parameter. The processor 124 uses a same algorithm to reduce the learning rate according to the first reduction parameter and the second reduction parameter, but the first reduction parameter is different from the second reduction parameter. It should be noted that, in an embodiment, the first increase parameter is greater than the second increase parameter, and the first reduction parameter is greater than the second reduction parameter. In other words, when the loss value decreases, the processor 124 will adjust the learning rate by a relatively large margin. When the loss value increases, the processor 124 will adjust the learning rate at a relatively small amplitude. Accordingly, this may not only accelerate learning efficiency of the neural network model, but also prevent the neural network model from being converged during the training.

Based on the above, in the embodiments of the disclosure, by attaching the white object to the target object, the true light source information may be directly obtained according to the color of the white object in the training image to facilitate the training of the neural network model. In addition, in the embodiments of the disclosure, during the training of the neural network model, the learning rate for training the neural network model is adaptively adjusted based on the predicted light source information to facilitate the training efficiency and the accuracy of predicting ambient light sources by the neural network model. As a result, in the embodiments of the disclosure, more accurate image white balance correction may be performed based on accurate light source information.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A method for establishing a light source information prediction model, comprising:
    capturing a plurality of training images for a target object, wherein a white object is attached on the target object;
    obtaining true light source information of the training images according to a color of the white object in each of the training images; and
    training a neural network model according to the training images and the true light source information, and generating a plurality of pieces of predicted light source information according to the neural network model during the training, wherein
    a learning rate for training the neural network model is adaptively adjusted based on the predicted light source information;
    wherein training the neural network model according to the training images and the true light source information and generating the pieces of predicted light source information according to the neural network model during the training further comprises:

performing white balance processing on the training images according to the predicted light source information to obtain a plurality of adjustment images;

determining the learning rate for training the neural network model according to the adjustment images;

inputting the predicted light source information and the corresponding true light source information into a loss function to generate a loss value;

wherein a weight information be adjusted in the neural network model according to the loss value.

2. The method for establishing the light source information prediction model according to claim 1, wherein the adjustment images comprise a first adjustment image, a second adjustment image, and a third adjustment image, and determining the learning rate for training the neural network model according to the adjustment images comprises:

generating a first gap parameter between the first adjustment image and the second adjustment image by comparing a plurality of pixel values in the second adjustment image and a plurality of corresponding pixel values in the first adjustment image;

generating a second gap parameter between the second adjustment image and the third adjustment image by comparing a plurality of pixel values in the third adjustment image and the corresponding pixel values in the second adjustment image; and increasing or reducing the learning rate according to the first gap parameter and the second gap parameter.

3. The method for establishing the light source information prediction model according to claim 2, wherein increasing or reducing the learning rate according to the first gap parameter and the second gap parameter comprises:

increasing or reducing the learning rate according to the loss value by comparing the first gap parameter and the second gap parameter.

4. The method for establishing the light source information prediction model according to claim 3, wherein increasing or reducing the learning rate according to the loss value by comparing the first gap parameter and the second gap parameter comprises:

increasing the learning rate according to a first increase parameter when the loss value decreases and the second gap parameter is greater than the first gap parameter; and reducing the learning rate according to a first reduction parameter when the loss value decreases and the second gap parameter is less than the first gap parameter.

5. The method for establishing the light source information prediction model according to claim 4, wherein increasing or reducing the learning rate according to the loss value by comparing the first gap parameter and the second gap parameter further comprises:

increasing the learning rate according to a second increase parameter when the loss value increases and the second gap parameter is greater than the first gap parameter; and reducing the learning rate according to a second reduction parameter when the loss value increases and the second gap parameter is less than the first gap parameter.

6. The method for establishing the light source information prediction model according to claim 5, wherein the first increase parameter is greater than the second increase parameter, and the first reduction parameter is greater than the second reduction parameter.

7. The method for establishing the light source information prediction model according to claim 2, wherein a hidden layer of the neural network model sequentially generates the predicted light source information based on the training images on a time sequence.

8. The method for establishing the light source information prediction model according to claim 1, wherein the neural network model is a recurrent neural network (RNN).

9. A system for establishing a light source information prediction model, comprising:

an image sensor configured to capture a plurality of training images for a target object, wherein a white object is attached on the target object;

a storage device configured to store a plurality of modules; and a processor coupled to the storage device and configured to execute the modules for:

obtaining true light source information of the training images according to a color of the white object in each of the training images; and training a neural network model according to the training images and the true light source information, and generating a plurality of pieces of predicted light source information according to the neural network model during the training, wherein a learning rate for training the neural network model is adaptively adjusted based on the predicted light source information;

wherein training the neural network model according to the training images and the true light source information and generating the pieces of predicted light source information according to the neural network model during the training, the processor further executes the modules for:

performing white balance processing on the training images according to the predicted light source information to obtain a plurality of adjustment images;

determining the learning rate for training the neural network model according to the adjustment images;

inputting the predicted light source information and the corresponding true light source information into a loss function to generate a loss value;

wherein a weight information be adjusted in the neural network model according to the loss value.

* * * * *